United States Patent
Derbanne et al.

(10) Patent No.: US 11,636,708 B2
(45) Date of Patent: Apr. 25, 2023

(54) FACE DETECTION IN SPHERICAL IMAGES

(71) Applicant: GoPro, Inc., San Mateo, CA (US)

(72) Inventors: Thomas Armel Derbanne, Paris (FR); Bruno César Douady, Orsay (FR); Maxim Karpushin, Paris (FR)

(73) Assignee: GoPro, Inc., San Mateo, CA (US)

( * ) Notice: Subject to any disclaimer, the term of this patent is extended or adjusted under 35 U.S.C. 154(b) by 113 days.

(21) Appl. No.: 17/420,741

(22) PCT Filed: Jan. 2, 2020

(86) PCT No.: PCT/US2020/012027
§ 371 (c)(1),
(2) Date: Jul. 6, 2021

(87) PCT Pub. No.: WO2020/142589
PCT Pub. Date: Jul. 9, 2020

(65) Prior Publication Data
US 2022/0108559 A1     Apr. 7, 2022

Related U.S. Application Data

(60) Provisional application No. 62/788,355, filed on Jan. 4, 2019.

(51) Int. Cl.
*G06V 40/16*     (2022.01)
*G06T 3/40*      (2006.01)
(Continued)

(52) U.S. Cl.
CPC .......... *G06V 40/166* (2022.01); *G06T 3/0087* (2013.01); *G06T 3/40* (2013.01);
(Continued)

(58) Field of Classification Search
CPC .... G06V 40/166; G06V 10/16; G06T 3/0087; G06T 3/40; G06T 2207/20221
See application file for complete search history.

(56) References Cited

U.S. PATENT DOCUMENTS 6,359,617 B1 * 3/2002 Xiong ..................... G06T 5/50
                                              715/848
9,355,433 B1 * 5/2016 Adsumilli ........... G06T 3/0093
(Continued)

FOREIGN PATENT DOCUMENTS

JP     2004054928 A  *  2/2004  ............. G06T 5/008
JP     2018156368 A  * 10/2018  ......... G06K 9/00288
WO       9701241 A1     1/1997

OTHER PUBLICATIONS

I. -C. Lo, K. -T. Shih and H. H. Chen, "Image Stitching for Dual Fisheye Cameras," 2018 25th IEEE International Conference on Image Processing (ICIP), 2018, pp. 3164-3168, doi: 10.1109/ICIP. 2018.8451333. (Year: 2018).*

(Continued)

*Primary Examiner* — Michael Robert Cammarata
(74) *Attorney, Agent, or Firm* — Young Basile Hanlon & MacFarlane, P.C.

(57) ABSTRACT

A face located along a stitch line in a spherical image is detected by rendering views of regions of the spherical image along the stitch line. The spherical image may be produced by combining first and second images. A first view of a projection of the spherical image is rendered. A scaling factor for rendering a second view of the projection is determined based characteristics of the first portion of the face. The second view is then rendered according to the scaling factor. The use of the scaling factor to render the second view causes a change in the depiction of the second portion of the face. For example, the scaling factor can indicate to change the resolution or expected size of the second portion of the face when rendering the second view. A face is then detected within the spherical image based on the rendered first and second views.

20 Claims, 8 Drawing Sheets

(51) Int. Cl.
  *H04N 13/156* (2018.01)
  *G06V 10/10* (2022.01)
  *G06V 10/147* (2022.01)
  *G06T 3/00* (2006.01)
  *H04N 5/232* (2006.01)

(52) U.S. Cl.
  CPC ............ *G06V 10/147* (2022.01); *G06V 10/16* (2022.01); *H04N 13/156* (2018.05); *G06T 2207/20221* (2013.01); *H04N 5/23219* (2013.01)

(56) References Cited

U.S. PATENT DOCUMENTS

| | | | | |
|---|---|---|---|---|
| 10,992,870 | B1* | 4/2021 | Gupta | G06V 10/25 |
| 11,443,409 | B1* | 9/2022 | Newman | G06T 3/0025 |
| 11,523,035 | B2* | 12/2022 | Cotoros | G03B 17/08 |
| 2002/0122113 | A1* | 9/2002 | Foote | G06T 7/33 |
| | | | | 348/48 |
| 2012/0269390 | A1* | 10/2012 | Osa | G06T 1/60 |
| | | | | 382/103 |
| 2015/0109402 | A1* | 4/2015 | Tian | H04N 5/23219 |
| | | | | 348/14.07 |
| 2015/0254871 | A1* | 9/2015 | MacMillan | H04L 65/612 |
| | | | | 382/180 |
| 2016/0007018 | A1* | 1/2016 | Ooi | G06T 7/0002 |
| | | | | 348/187 |
| 2016/0037082 | A1* | 2/2016 | Wang | G06T 7/37 |
| | | | | 348/65 |
| 2016/0088287 | A1* | 3/2016 | Sadi | H04N 13/194 |
| | | | | 348/43 |
| 2016/0286137 | A1* | 9/2016 | Marks | G06T 5/002 |
| 2016/0295128 | A1* | 10/2016 | Schnittman | G10L 21/028 |
| 2017/0004622 | A1* | 1/2017 | Adsumilli | G06T 11/60 |
| 2017/0140791 | A1* | 5/2017 | Das | G11B 27/036 |
| 2017/0287184 | A1* | 10/2017 | Pettersson | G06T 3/0093 |
| 2018/0060682 | A1* | 3/2018 | Cho | H04N 5/23238 |
| 2018/0270428 | A1* | 9/2018 | Nose | H04N 7/15 |
| 2018/0352165 | A1* | 12/2018 | Zhen | G06T 5/50 |
| 2021/0289134 | A1* | 9/2021 | Athreya | G06V 40/168 |

OTHER PUBLICATIONS

Ozawa, Tomohiro, Kris M. Kitani, and Hideki Koike. "Human-centric panoramic imaging stitching." Proceedings of the 3rd Augmented Human International Conference. 2012. (Year: 2012).*

T. Ho and M. Budagavi, "Dual-fisheye lens stitching for 360-degree imaging," 2017 IEEE International Conference on Acoustics, Speech and Signal Processing (ICASSP), 2017, pp. 2172-2176, doi: 10.1109/ICASSP.2017.7952541. (Year: 2017).*

Z. Liu, M. Cohen, D. Bhatnagar, R. Cutler and Z. Zhang, "Head-Size Equalization for Improved Visual Perception in Video Conferencing," in IEEE Transactions on Multimedia, vol. 9, No. 7, pp. 1520-1527, Nov. 2007, doi: 10.1109/TMM.2007.906571. (Year: 2007).*

S. Yadav, P. Choudhary, S. Goel, S. Parameswaran, P. Bajpai and J. Kim, "Selfie Stitch: Dual Homography Based Image Stitching for Wide-Angle Selfie," 2018 IEEE International Conference on Multimedia & Expo Workshops (ICMEW), 2018, pp. 1-4, doi: 10.1109/ICMEW.2018.8551551. (Year: 2018).*

International Search Report and Written Opinion issued in PCT/US2020/012027, dated Jun. 24, 2020, 23 pages.

International Preliminary Report on Patentability for App. No. PCT/US2020/012027, dated Jun. 16, 2021, 14 pages.

Tomohiro Ozawa et al: "Human-centric panoramic imaging stitching", Proceedings of the 3rd Augmented Human International Conference, AH 2012, Megeve, France, Mar. 8-9, 2012, Jan. 1, 2012 (Jan. 1, 2012), pp. 1-6, XP055271715, New York, NY, USA DOI: 10.1145/2160125.2160145 ISBN: 978-1-4503-1077-2.

* cited by examiner

FACE DETECTION IN SPHERICAL IMAGES

CROSS-REFERENCE TO RELATED APPLICATIONS

This application is a 371 of International Application No. PCT/US2020/012027, filed on Jan. 2, 2020, which claims priority to U.S. Provisional Application No. 62/788,355, filed on Jan. 4, 2019, the entire contents of which are hereby incorporated by reference.

TECHNICAL FIELD

This disclosure relates to face detection in spherical images, in particular, to detecting faces which overlap multiple views of a spherical image.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be processed and then stored or output. In some cases, the ISP may be used to capture multiple images or video frames which are spatially adjacent or otherwise include overlapping content

SUMMARY

This disclosure describes, inter alia, systems and techniques for face detection in spherical images.

One aspect of this disclosure is an image processor comprising an image capture unit, an image processing unit, and a face detection unit. The image capture unit is configured to capture a first image using a first lens and a second image using a second lens. The first image depicts a first portion of a face and the second image depicts a second portion of the face. The image processing unit is configured to produce a spherical image by combining the first image and the second image and to determine a projection of the spherical image. The projection includes a number of views in which each of the views including a two-dimensional representation of a portion of the spherical image. The face detection unit is configured to perform face detection against the spherical image. The face detection unit performs the face detection by: rendering a first view of the projection of the spherical image based on a determination that the first portion of the face is located within the first view, wherein the first view corresponds to the first image; determining, based on one or more characteristics of the first portion of the face, a scaling factor for rendering a second view of the projection of the spherical image; rendering the second view according to the scaling factor, wherein use of the scaling factor to render the second view causes a change in depiction of the second portion of the face, wherein the second view corresponds to the second image; and detecting the face within the spherical image based on the rendered first view and the rendered second view.

In some implementations of the image processor, determining the projection of the spherical image comprises scanning the spherical image to determine an expected location of the face in the projection of the spherical image, and the face detection unit renders the first view based on a determination that the expected location of the face is partially in the first view.

In some implementations of the image processor, determining the scaling factor for rending the second view comprises determining the scaling factor based on a size of the first portion of the face within the rendered first view.

In some implementations of the image processor, the scaling factor indicates to decrease a resolution of the spherical image and increase an expected size of the second portion of the face, and the change in the depiction of the second portion of the face is an increase in a size of the second portion of the face.

In some implementations of the image processor, increasing the expected size of the second portion of the face increases an amount of overlap at a stitch line of the spherical image, the stitch line representing a location at which the first image and the second image are adjoined.

In some implementations of the image processor, the amount of overlap is a sum of a first value and a second value, the first value indicating a number of pixels representing a dimension of the second portion of the face, the second value indicating a minimum face size detectable by the face detection unit.

In some implementations of the image processor, the projection of the spherical image is a cube map projection, and the cube map projection includes six views, the six views including the first view and the second view, each of the six views representing a different two-dimensional planar view of the cube map projection.

In some implementations of the image processor, each of the first lens and the second lens has a greater than 180 degree field-of-view.

Another aspect of this disclosure is an image capture apparatus comprising a first image sensor and a second image sensor arranged in opposing directions, a processor, and a memory including instructions executable by the processor. The instructions include instructions to: produce a spherical image by stitching a first image captured using the first image sensor and a second image captured using the second image; scan the spherical image to detect a face located along a stitch line of the spherical image, wherein a first portion of the face is located in a first region corresponding to the first image and a second portion of the face is located in a second region corresponding to the second image; determine a projection of the spherical image by transforming the first image and the second image using a projection scheme; generate a first rendered view and a second rendered view of the projection of the spherical image, wherein the first rendered view corresponds to the first region and the second rendered view corresponds to the second region; and output an indication of the detected face within the first rendered view and the second rendered view.

In some implementations of the image capture apparatus, the first image sensor and the second image sensor have overlapping fields of view and the instructions to produce the spherical image by stitching the first image captured using the first image sensor and the second image captured using the second image include instructions to identify overlapping regions of the first image and the second image based on luminance distribution statistics of the first image and of the second image.

In some implementations of the image capture apparatus, the instructions to generate the first rendered view and the second rendered view of the projection of the spherical image include instructions to: generate the first rendered view based on a determination that the first portion of the face is located within the first region; and generate the second rendered view according to a scaling factor, wherein use of the scaling factor to generate the second rendered view causes a change in depiction of the second portion of the face.

In some implementations of the image capture apparatus, the scaling factor is determined based on one or more characteristics of the first portion of the face.

In some implementations of the image capture apparatus, the scaling factor indicates to decrease a resolution of the spherical image and increase an expected size of the second portion of the face.

In some implementations of the image capture apparatus, the instructions to scan the spherical image to detect the face located along the stitch line of the spherical image include instructions to: iteratively scan portions of the spherical image using a window to detect the first portion of the face; determine the scaling factor; and change a size of the window to look for the second portion of the face.

Yet another aspect of this disclosure is a method comprising: producing a spherical image by combining a first image and a second image; identifying a first portion of a face within a first region of the first image; scaling a second region of the second image based on a size of the first portion of the face, wherein the first region and the second region are located along a stitch line of the spherical image; generating rendered views of the first region and of the scaled second region; and outputting an indication that the face is detected within the rendered views.

In some implementations of the method, producing the spherical image by combining the first image and the second image comprises: capturing the first image using a first image sensor and a second image using a second image sensor; identifying overlapping regions of the first image and the second image based on luminance distribution statistics of the first image and of the second image; and stitching the first image and the second image according to the overlapping regions.

In some implementations of the method, the method further comprises: determining a projection of the spherical image by transforming the first image and the second image using a projection scheme.

In some implementations of the method, the projection includes a number of views, each of the views including a two-dimensional representation of a portion of the spherical image.

In some implementations of the method, the projection of the spherical image is a cube map projection and the cube map projection includes six views, each of the six views representing a different two-dimensional planar view of the cube map projection.

In some implementations of the method, scaling the second region of the second image based on the size of the first portion of the face comprises changing a resolution of the spherical image.

These and other aspects of this disclosure are disclosed in the following detailed description, the appended claims, and the accompanying figures.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1A:
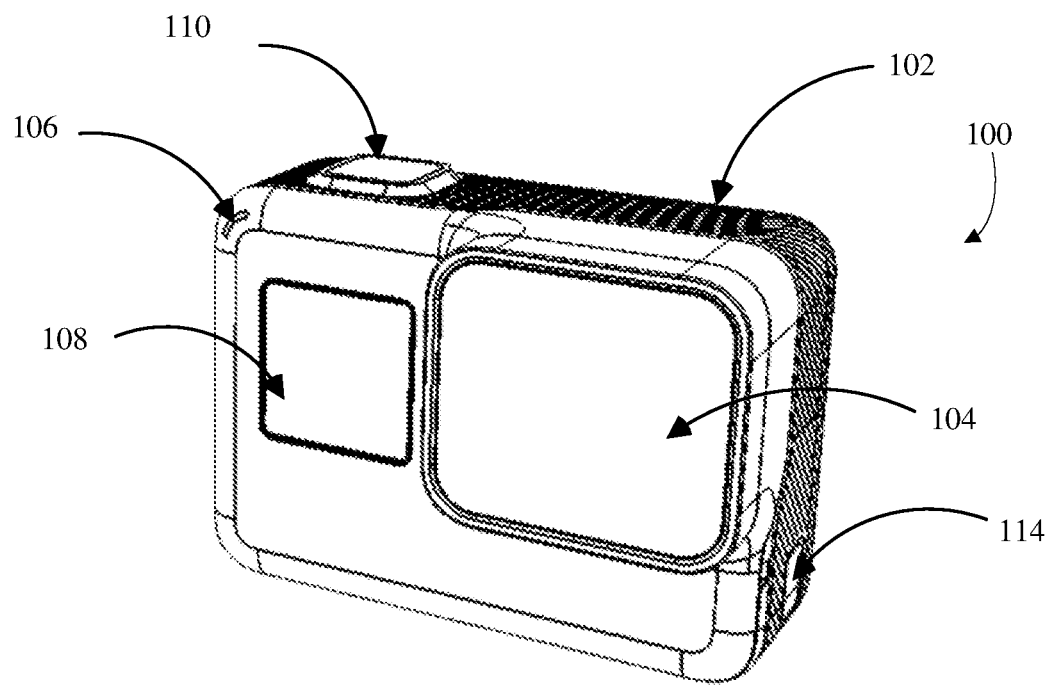
FIGS. 1A-D are isometric views of an example of an image capture device.
Figure 1B:
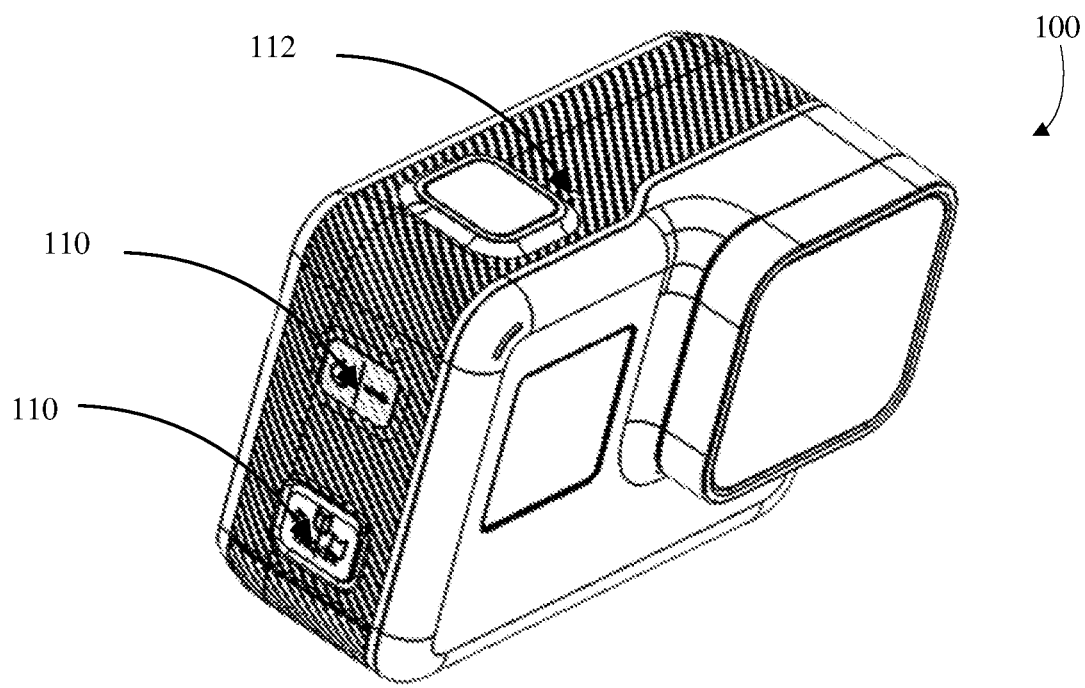
Figure 1C:
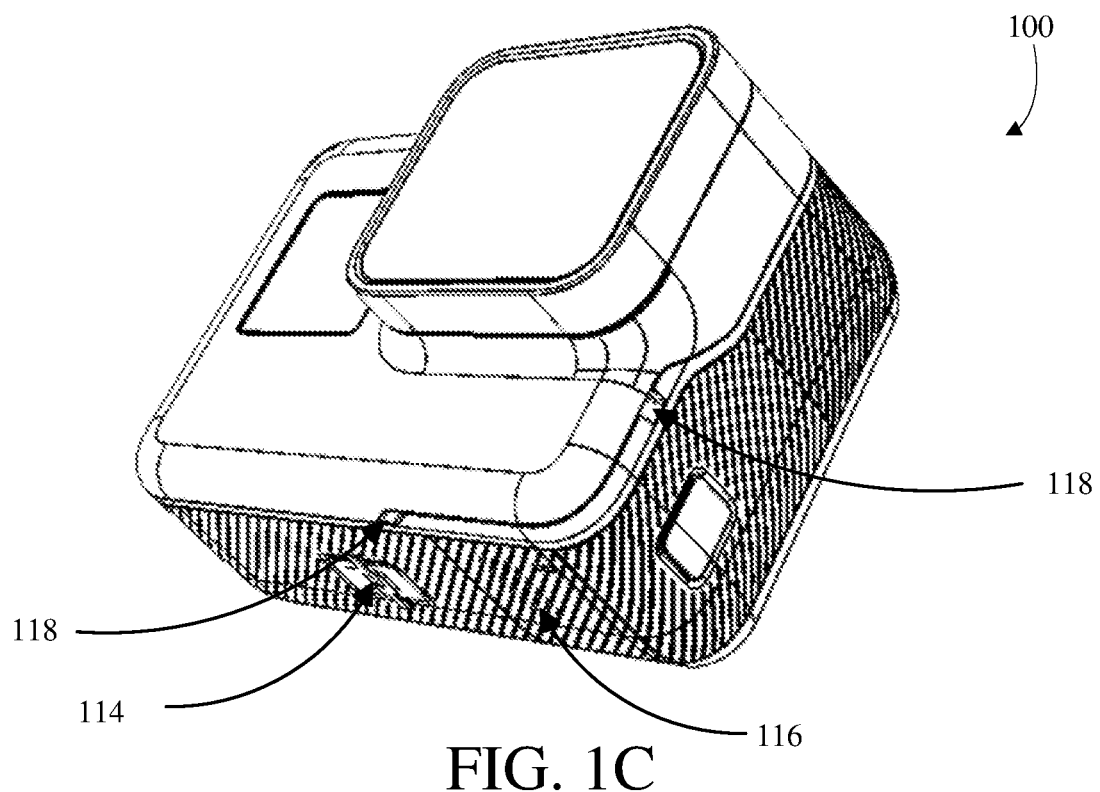
Figure 1D:
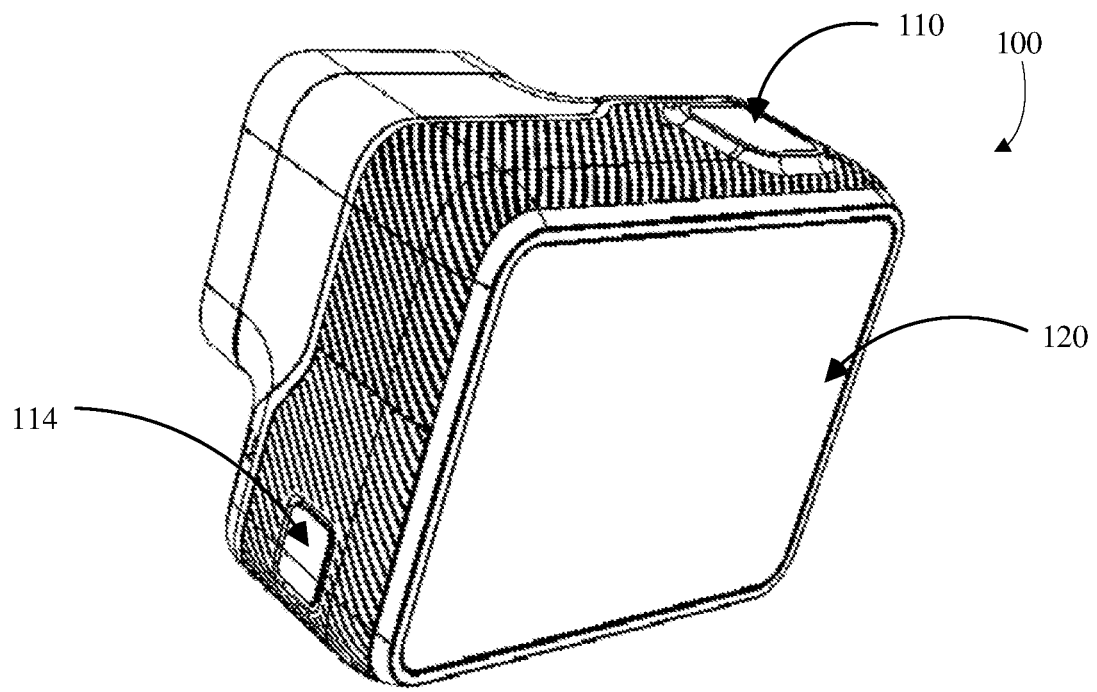

Image capture devices are designed with numerous features to assists users in producing high quality images. One example of such a feature is the ability to combine two or more images into a single, composite image. A typical example of a composite image is a two-dimensional panoramic image, which is typically produced by horizontally combining two images to show a larger scene than could be shown by a single image alone. Combining two or more subject images to produce a composite image requires careful processing of those images, such as to ensure that the juxtaposed portions of each respective subject image are aligned properly and with minimal distortion.

One approach to combining images in this way is image stitching. Image stitching is the process of combining multiple images with overlapping fields-of-view to produce a composite image. Image stitching may include aligning the pixels of two images being combined in a region along a boundary between sections of a composite image that are respectively based on two different input images. The resulting line or lines of pixels forming the overlapping portion between those two images is referred to as a stitch line. The stitching may be passively performed (e.g., by a processing component of the image capture device or another device), such as automatically upon the capturing of the subject images. Alternatively, the stitching may be in response to user intervention, such as by a user of the image capture device selecting to combine the subject images.

Another example of a composite image which may be produced using image stitching is a spherical image, which may also be referred to as a 360 degree image. A spherical image is a composite image formed by stitching two or more images having overlapping fields of view such that the resulting image shows a complete 360 degree field-of-view around the image capture device used to capture those two or more images. For example, a spherical image may be produced by stitching two or more images captured using fisheye lenses. Improvements in image capture technology have made spherical images increasingly popular. For example, spherical images are frequently used to show a full environmental rendering of a scene, such as to immerse a viewer in the environment. In another example, spherical images are used to produce virtual reality experiences.

As with conventional two-dimensional images, spherical images may be processed using one or more techniques to identify and/or enhance the content thereof. One example of such processing is face detection, in which an image is processed to detect the presence of human faces within the image. In the context of a spherical image, face detection includes processing each view to determine whether a face is present. Since there may be several views stitched together to form the spherical image (e.g., six views, such as where a cube map projection is applied), conventional face detection techniques would require substantially more resources to process a spherical image than a typical two-dimensional image.

However, there may be several drawbacks to using conventional face detection techniques on a spherical image. First, it may be computationally expensive and take a large amount of computing resources away from other image processing aspects. That is, face detection performed against a conventional two-dimensional image can become computationally expensive with a single view. The use of as many as six views for a spherical image can thus burden the computing system. Second, because there may be distortion introduced in the spherical image at or near the stitch lines, a conventional face detection technique may not be able to positively identify a face appearing at or near a stitch line. For example, the image stitching performed to produce the spherical image may cause image objects such as faces to scale differently on each side of a stitch line. If portions of a face are differently sized or oriented on each side of a stitch line, the face will likely not be detected.

Implementations of this disclosure address problems such as these by rendering views of regions of a spherical image along a stitch line which separates portions of a face in a spherical image. The spherical image may be produced by combining first and second images. A first view of a projection of the spherical image is rendered. A scaling factor for rendering a second view of the projection is determined based characteristics of the first portion of the face. The second view is then rendered according to the scaling factor. The use of the scaling factor to render the second view causes a change in the depiction of the second portion of the face. For example, the scaling factor can indicate to change the resolution or expected size of the second portion of the face when rendering the second view. A face is then detected within the spherical image based on the rendered first and second views. The implementations of this disclosure thus describe rendering views for portions of a spherical image that include faces and not for others. This limited rending reduces computational expense by reducing the number of image regions which are processed.

Although the implementations of this disclosure are described with respect to spherical images, the implementations of this disclosure may be used for face detection in other types of stitched images. For example, implementations of this disclosure may be used to detect one or more faces in a panoramic image comprised of two or more horizontally-stitched or vertically-stitched image. Furthermore, the implementations of this disclosure may be used for face detection in videos that use spherical images or other types of stitched images.

The implementations of this disclosure are described in detail with reference to the drawings, which are provided as examples so as to enable those skilled in the art to practice the technology. The figures and examples are not meant to limit the scope of this disclosure to a single implementation, and other implementations are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video, and to store captured images and video for subsequent display or playback.

The image capture device 100 can include various indicators, including the LED lights 106 and the LCD display 108. The image capture device 100 can also include buttons 110 configured to allow a user of the image capture device 100 to interact with the image capture device 100, to turn the image capture device 100 on, and to otherwise configure the operating mode of the image capture device 100. The image capture device 100 can also include a microphone 112 configured to receive and record audio signals in conjunction with recording video. The side of the image capture device 100 may include an I/O interface 114.

The camera may also include a microphone 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the image capture device 100 may include a lens 104 configured to receive light incident upon the lens and to direct received light onto an image sensor internal to the lens.

The image capture device 100, includes a camera exterior that encompasses and protects the camera's internal electronics, which are further described in later sections. The camera exterior includes six surfaces (i.e. a front face, a left face, a right face, a back face, a top face, and a bottom face), wherein the exterior surfaces form a rectangular cuboid. Furthermore, both the front and rear surfaces of the image capture device 100 are substantially rectangular in shape. The image capture device 100 can be made of a rigid material such as plastic, aluminum, steel, or fiberglass.

Additional camera features, such as the features described above, may be affixed to an exterior of the camera. In some implementations, the camera described herein includes features other than those described below. For example, instead of a single interface button, the camera can include additional buttons or different interface features, such as a multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, in some implementations, the image capture device 100 may include one or more microphones, which may receive, capture, and record audio information, which may be associated with images acquired by the image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

Figure 3:
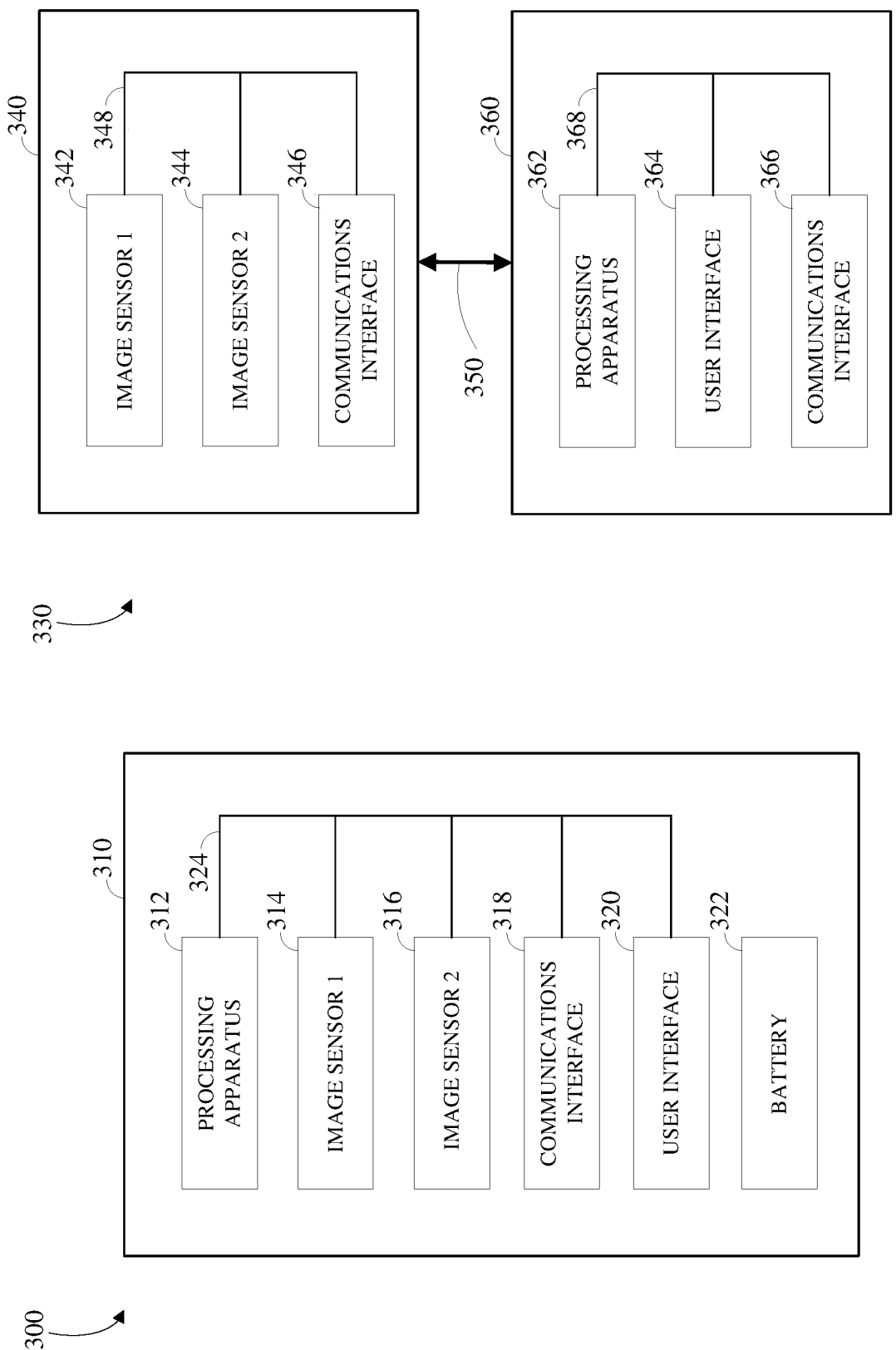
FIGS. 3A-B are block diagrams of examples of systems configured for image capture.

In some implementations, the image capture device 100 may interface with or communicate with an external device, such as an external user interface device, via a wired or wireless computing communication link (not shown). The user interface device may, for example, be the personal computing device 360 described below with respect to FIG. 3. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the image capture device 100 may transmit images, such as panoramic images, or portions thereof, to the user interface device (not shown) via the computing communication link, and the user interface device may store, process, display, or a combination thereof the panoramic images.

In some implementations, the user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

In some implementations, the user interface device may display, or otherwise present, content, such as images or video, acquired by the image capture device 100. For example, a display of the user interface device may be a viewport into the three-dimensional space represented by the panoramic images or video captured or created by the image capture device 100.

In some implementations, the user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

In some implementations, the user interface device may implement or execute one or more applications to manage or control the image capture device 100. For example, the user interface device may include an application for controlling camera configuration, video acquisition, video display, or any other configurable or controllable aspect of the image capture device 100.

In some implementations, the user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

In some implementations, the user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

In some implementations, the user interface device, such as via an application, may display, or otherwise present, marks or tags associated with images or video, such as in response to user input. For example, marks may be presented in a camera roll application for location review and/or playback of video highlights.

In some implementations, the user interface device, such as via an application, may wirelessly control camera software, hardware, or both. For example, the user interface device may include a web-based graphical interface accessible by a user for selecting a live or previously recorded video stream from the image capture device 100 for display on the user interface device.

In some implementations, the user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
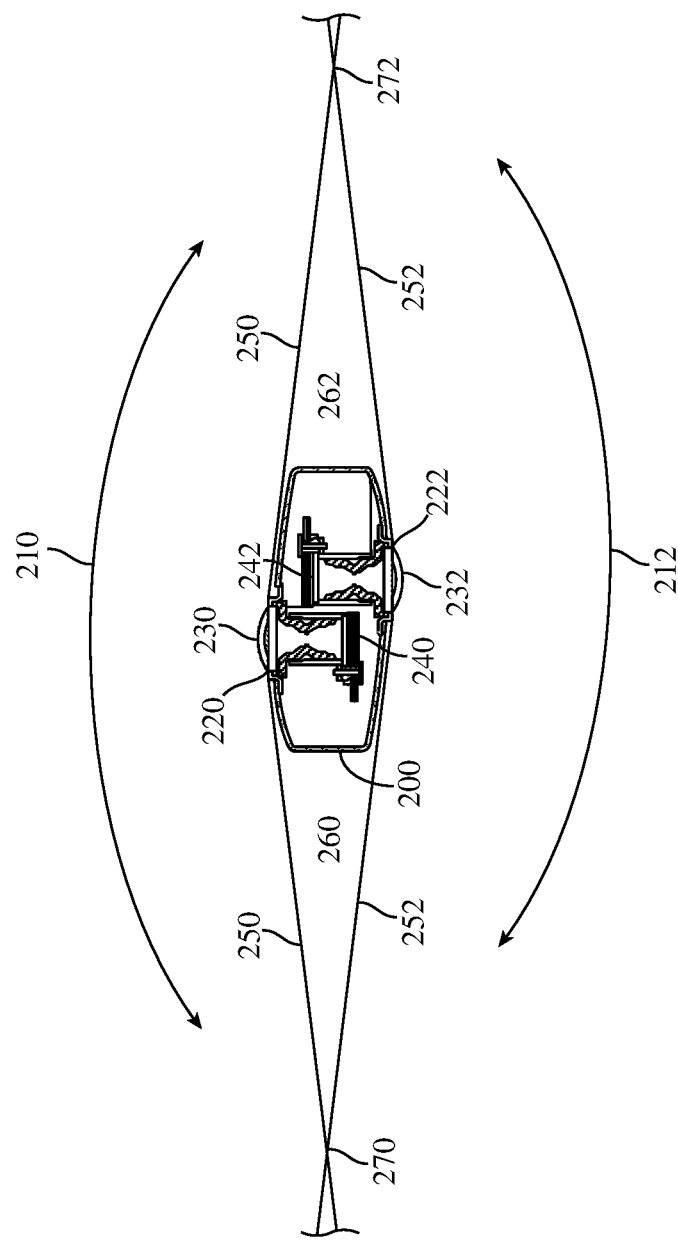
FIG. 2 is a cross-sectional view of an example of an image capture device including overlapping fields-of-view.

FIG. 2 is a cross-sectional view of an example of a dual-lens image capture device 200 including overlapping fields-of-view 210, 212. In some implementations, the image capture device 200 may be a spherical image capture device with fields-of-view 210, 212 as shown in FIG. 2. For example, the image capture device 200 may include image capture devices 220, 222, related components, or a combination thereof, arranged in a back-to-back or Janus configuration. For example, a first image capture device 220 may include a first lens 230 and a first image sensor 240, and a second image capture device 222 may include a second lens 232 and a second image sensor 242 arranged oppositely from the first lens 230 and the first image sensor 240. Accordingly, the first image sensor 240 and the second image sensor 242 are arranged in opposing directions.

The first lens 230 of the image capture device 200 may have the field-of-view 210 shown above a boundary 250. Behind the first lens 230, the first image sensor 240 may capture a first hyper-hemispherical image plane from light entering the first lens 230, corresponding to the first field-of-view 210.

The second lens 232 of the image capture device 200 may have a field-of-view 212 as shown below a boundary 252. Behind the second lens 232, the second image sensor 242 may capture a second hyper-hemispherical image plane from light entering the second lens 232, corresponding to the second field-of-view 212.

One or more areas, such as blind spots 260, 262, may be outside of the fields-of-view 210, 212 of the lenses 230, 232, light may be obscured from the lenses 230, 232 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 230, 232, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image (e.g., where the stitch lines may be located at the stitch points 270, 272).

A small change in the alignment, such as position and/or tilt, of the lenses 230, 232, the image sensors 240, 242, or both may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 230, 232 and the image sensors 240, 242 such that the fields-of-view 210, 212, stitch points 270, 272, or both may be accurately determined, which may improve the accuracy, efficiency, or both of generating a combined image.

Optical axes through the lenses 230, 232 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 230, 232, such that the image sensors may be perpendicular to the respective axes to within a tolerance such as 1%, 3%, 5%, 10%, and/or other tolerances.

The lenses 230, 232 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 230, 232 may include substantially reduced thickness relative to the lengths of the lens barrels securing the lenses 230, 232. For example, the overall thickness of the image capture device 200 may be close to the length of a single lens barrel as opposed to twice the length of a single lens barrel as in a back-to-back configuration. Reducing the lateral distance between the lenses 230, 232 may improve the overlap in the fields-of-view 210, 212.

Images or frames captured by an image capture device, such as the image capture device 100 shown in FIGS. 1A-D or the image capture device 200 shown in FIG. 2, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of systems configured for image capture. Referring first to FIG. 3A, an image capture device 300 configured for image capture is shown. The image capture device 300 includes an image capture device 310 (e.g., a camera or a drone), which may, for example, be the image capture device 100 shown in FIGS. 1A-D. The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316.

The image capture device 310 includes a communications interface 318 for transferring images to other devices. The image capture device 310 includes a user interface 320, which may allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 are configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The image capture device 310 may include a communications interface 318, which may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The image capture device 310 may include a user interface 320. For example, the user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures. The image capture device 310 may include a battery 322 that powers the image capture device 310 and/or its peripherals. For example, the battery 322 may be charged wirelessly or through a micro-USB interface.

In some implementations, the image capture device 310 may include one or more hardware or software components for performing global tone mapping against pixels of an image captured using the image capture device 310. The global tone mapping performed using those one or more hardware or software components may integrate color correction operations. For example, those one or more hardware or software components may be used to perform the technique 1200 described below with respect to FIG. 12.

Referring next to FIG. 3B, a system 330 configured for image capture is shown. The system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D. The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor, and receive a second image from the second image sensor 344. The processing apparatus 362 may be configured to perform image signal processing (e.g., filtering, tone mapping, stitching, and/or encoding) to generate output images based on image data from the image sensors 342 and 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via the bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via the bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

In some implementations, the image capture device 340 and/or the personal computing device 360 may include one or more hardware or software components for performing global tone mapping against pixels of an image captured using the image capture device 340. The global tone mapping performed using those one or more hardware or software components may integrate color correction operations. For example, those one or more hardware or software components may be used to perform the technique 1200 described below with respect to FIG. 12.

Figure 4:
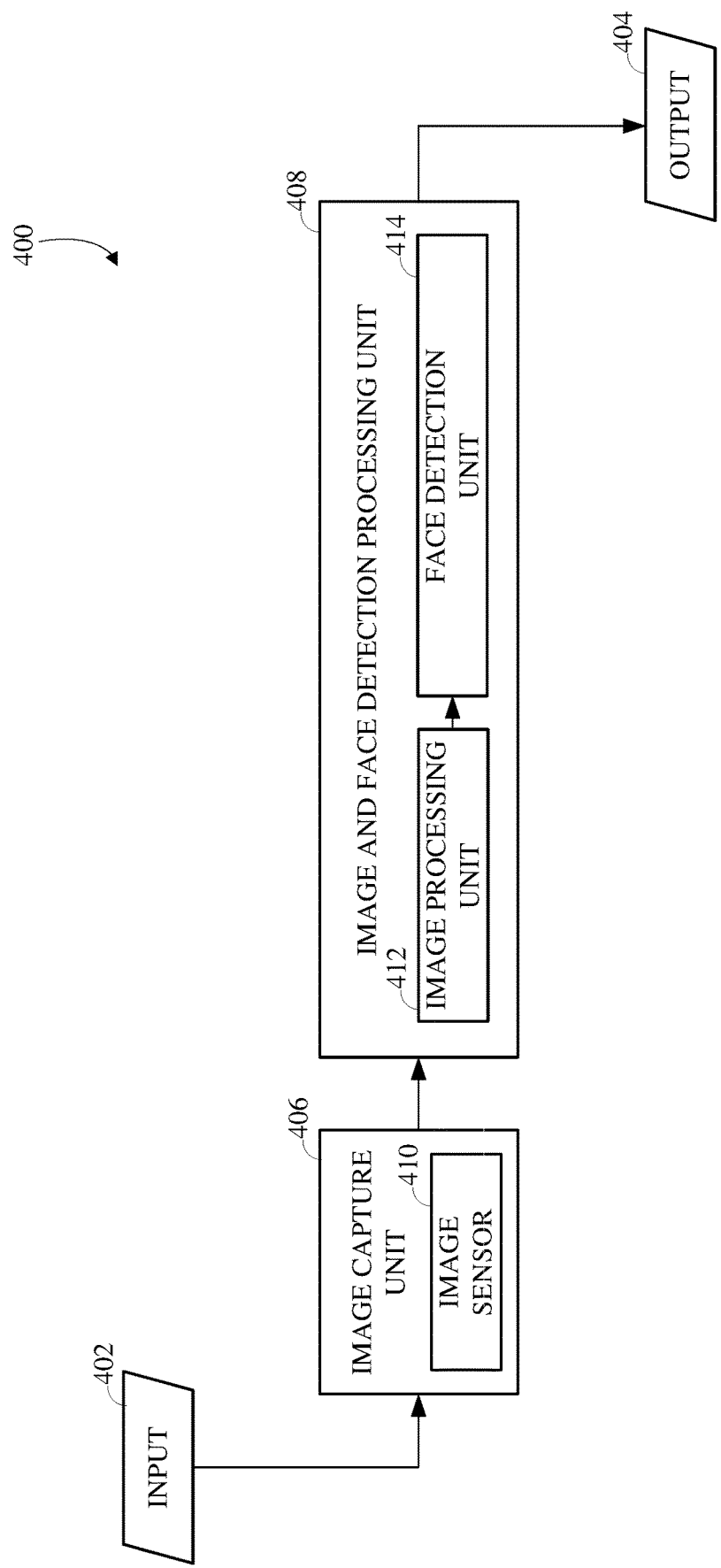
FIG. 4 is a block diagram of an example of an image processing and coding pipeline.

FIG. 4 is a block diagram of an example of an image processing and coding pipeline 400. The image processing and coding pipeline 400 may be included in an image capture device, such as the image capture device 100 shown in FIGS. 1A-D or the image capture device 200 shown in FIG. 2. Alternatively, or additionally, the image processing and coding pipeline 400 may represent functionality of an integrated circuit, for example, including an image capture unit, an image and face detection processing unit, or a combined image capture unit and image and face detection processing unit.

The image processing and coding pipeline 400 receives input 402 and processes the input 402 to produce output 404 using an image capture unit 406 and an image and face detection processing unit 408. The input 402 includes information or measurements usable to capture images using the image capture unit 406. For example, the input 402 may include measurements and/or other information used by an image sensor 410 of the image capture unit 406 to capture images. For example, the input 402 may refer to images generated using a 360 degree field-of-view image sensor, such as where each of the images is produced based on a greater than 180 degree field-of-view. In another example, the input 402 may refer to one or more images generated using other fields-of-view. The input 402 is captured using the image capture unit 406 and processed using the image and face detection processing unit 408 to produce the output 404, which may be a spherical image resulting from the processing of the input 402. Alternatively, the output 404 may refer to information associated with that image, for example, indications of detected faces within that image.

The image sensor 410 may, for example, be one or more of an image sensor of the image capture device 100, an image sensor of the image capture device 200 (e.g., the image sensor 240 or the image sensor 242), an image sensor of the image capture device 300 (e.g., the first image sensor 314 or the second image sensor 316), or an image sensor of the image capture device 340 (e.g., the first image sensor 342 or the second image sensor 344). In some implementations, the image capture unit 406 may include additional components beyond the image sensor 410. For example, the image capture unit 406 may refer to one or more components used to capture an image by the image capture device 100, the image capture device 200, the image capture device 300, or the image capture device 340.

The image and face detection processing unit 408 processes the images captured using the image capture unit 406 using image stitching and face detection techniques. The image and face detection processing unit 408 includes an image processing unit 412 and a face detection unit 414. In some implementations, the image processing unit 412 and the face detection unit 414 may be or refer to a single unit which performs one set of operations against the input 402.

The image processing unit 412 performs image processing against the images of the input 402 captured using the image capture unit 406. In particular, the image processing unit 412 processes those images using image stitching. Stitching the images can include identifying regions of the images which overlap and combining the images at those regions. For example, the overlapping regions can be identified based on luminance distribution statistics which are similar within each of the images. For example, the luminance distribution statistics may indicate one or more image objects, background features, or other visual depictions within the images.

The image processing unit 412 stitches the images by determining a projection for the resulting spherical image. The projection may be a spherical projection or an equirectangular projection determined by warping the images. For example, the warping can include transforming the images into the spherical space using a projection scheme (e.g., a cube map projection, equirectangular projection, equiangular cube map projection, or rotated sphere projection). That transformation may include utilizing depth measurements for the images to minimize visual artifacts for viewpoint difference. The projection determined for the spherical image can have a number of views. For example, where the projection uses a cube map projection or similar projection, the projection can have six views, wherein each of the six views corresponds to one facet of a cubical bounding box for the spherical image.

In some cases, after the spherical image is produced and the projection is determined, the image processing unit 412 can further process the image by blending pixels within regions of overlap. This may include the image processing unit 412 adjusting one or more exposure and/or contrast differences or settings for the image. Stitching the images of the input 402 together results in a seamless spherical image.

The face detection unit 414 receives the stitched spherical image produced using the image processing unit 412. The face detection unit 414 performs face detection to detect one or more faces within the spherical image. In particular, the face detection unit 414 is configured to detect a face located along the stitch line of the spherical image. For example, a first portion of the face may be located on a first side of the stitch line and a second portion of the face may be located on a second side of the stitch line. The face detection unit 414 processes the spherical image by rendering views according to the projection determined using the image processing unit 412. In some cases, rendering the views can include using a scaling factor determined based on characteristics of a portion of a face in a rendered view.

The output 404 is produced after the face is detected, such as by rendering the views that include the face and detecting the face within the rendered views. In some implementations, the face detection unit 414 may begin processing the input 402 before the image processing unit 412 has completed its processing. For example, the image processing unit 412 and the face detection unit 414 can simultaneously process the input 402. For example, information determined using the face detection unit 414 may be fed back into the image processing unit 412, such as to change one or more aspects of the image processing. For example, based on the size of a face detected using the face detection unit 414, the further processing of the image using the image processing unit 412 may be changed according to that detected face size.

Figure 5:
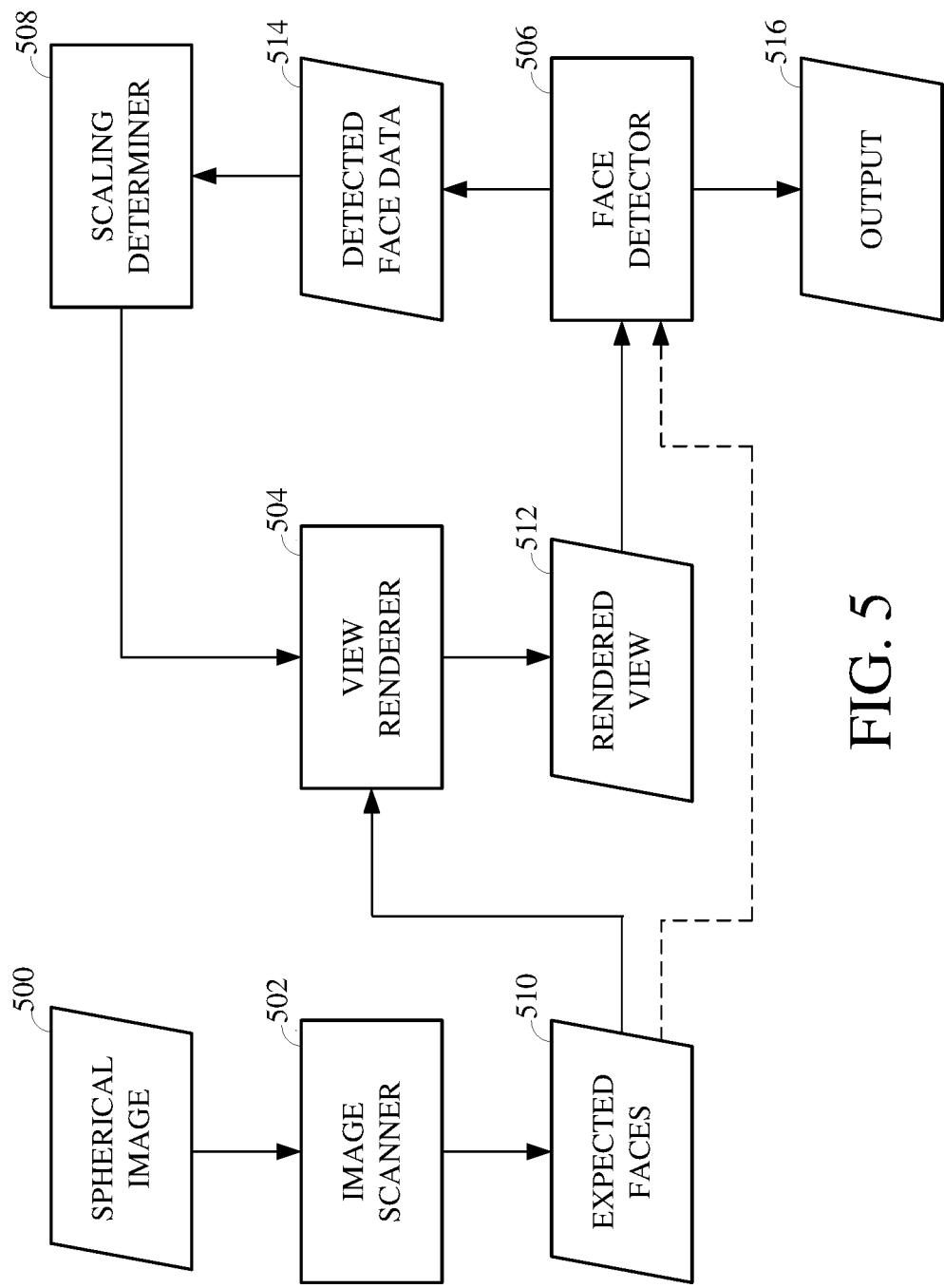
FIG. 5 is a diagram of an example of a data sequence based on face detection processing for a spherical image.

FIG. 5 is a diagram of an example of a data sequence based on face detection processing for a spherical image 500. The data sequence shown and described with respect to FIG. 5 may represent functionality of computing units described in the image processing and coding pipeline 400 of FIG. 4. For example, the data sequence shown and described with respect to FIG. 5 includes an image scanner 502, a view renderer 504, a face detector 506, and a scaling determiner 508. Each of the image scanner 502, the view renderer 504, the face detector 506, and the scaling determiner 508 may be a software process or software processes performed by executing or interpreting instructions or other code. In particular, each of the image scanner 502, the view renderer 504, the face detector 506, and the scaling determiner 508 may perform operations for image processing and face detection as described with respect to the image and face detection processing unit 408 shown in FIG. 4.

The spherical image 500 is a stitched image produced by combining two or more images. As such, the spherical image 500 includes one or more stitch lines. The spherical image 500 is processed using the image scanner 502, which scans the spherical image 500 to determine expected faces 510 within the spherical image 500. In particular, the image scanner 502 iteratively scans portions of the spherical image 500 using M×N-sized windows, where M and N may be the same or a different number. The windows are processing areas within which an image object such as a face may be detected. The windows may be of a fixed size. Alternatively, the windows may be of varying sizes.

The expected faces 510 represent output of the image scanner 502. The expected faces indicate locations within the spherical image 500 at which a face is expected to be detected, such as based on the iterative processing using the M×N-sized windows. The expected faces 510 are used as input to a view renderer 504. The view renderer 504 iteratively generates one or more views of a projection of the spherical image 500. For example, during a first pass, the view renderer 504 can render a first rendered view 512. The first rendered view 512 may be a view corresponding to a region of the spherical image 500 at which the expected faces 510 indicate a face will be detected. In particular, the first rendered view 512 may be a region of the spherical image 500 depicting a smallest face indicated in the expected faces 510.

After a rendered view 512 is rendered, a face detector 506 processes the rendered view 512 to determine whether all or a portion of a face is located in the rendered view 512. Determining whether all or a portion of a face is located in the rendered view 512 includes scanning the rendered view 512 for all or a portion of a face. For example, the face detector 506 can process pixel values according to their luminance distributions and compare those pixel values using pattern analyzers to determine whether the pixel values depict some or all of a face.

The face detector 506 outputs detected face data 514 indicating whether all or a portion of a face was determined to be located in the rendered view 512. Upon detecting a portion of a face in the rendered view 512, the detected face data 514 indicates information about the portion of the face, for example, a location within the rendered view 512 at which the portion of the face appears, an expected size of the face (e.g., based on a size of the portion of the face), and/or other information.

The scaling determiner 508 receives the detected face data 514 as input. The scaling determiner 508 processes the detected face data 514 to determine a scaling factor for use in rendering a next view of the projection of the spherical image 500. The scaling factor includes one or more values for configuring the rendering of the next view. For example, the scaling factor can indicate a resolution to use for rendering the next view, either by reciting a new resolution to use or by reciting an increase or decrease to the resolution used to render a most recent rendered view 512.

In another example, the scaling factor can indicate a size of a window to use to look for a remaining portion of a face detected in a most recent rendered view 512. For example, the most recent rendered view 512 may be a first view within which a first portion of a face is detected. The next view to be rendered will be a second view within which a second portion of the face may be detected. The scaling factor can indicate how to render and look for the second portion of the face within the second view.

Two rendered views 512 which are adjacent and together depict a face may be referred to as a view pair. Each view pair includes a region of overlap based on the adjoining of the views of the view pair. That is, each of the rendered views 512 includes information of adjacent regions of the spherical image 500. Thus, a view pair comprised of a left view and an adjoining right view may have a region of overlap between them in which the right side of the left view includes some information of the right view and the left side of the right view includes some information of the left view.

The region of overlap is X×Y pixels, where X and Y may be the same or a different number. The numbers of X and Y may be defined based on the abilities of a device used by the view renderer 504. In particular, the numbers of X and Y may be defined based on a minimum face size detectable using a hardware device executing software for the view renderer 504. For example, the hardware device may not be able to detect face sizes smaller than 10×10 pixels. In such a case, X and Y would each be equal to 10. The size of the region of overlap may vary based on the size of the face detected within the region of overlap. Alternatively, the size of the region of overlap may be fixed.

A rendering and scaling loop including the view renderer 504, the face detector 506, and the scaling determiner 508 can be repeated for each next view to be rendered. The face detector 506 may perform operations for determining whether to render a next view. For example, if the face detector 506 determines that a newly rendered view 512 does not include all or a portion of a face, the face detector 506 can exit the rendering and scaling loop. In another example, if the face detector 506 determines that a newly rendered view 512 does not include all or a portion of a face, the face detector 506 can process the expected faces 510 to determine whether a different region of the spherical image 500 which has not been rendered as a rendered view 512 includes a face. If so, the face detector 506 can cause the view renderer 504 to render such a rendered view 512. If not, the face detector 506 can exit the rendering and scaling loop.

Upon exiting the rendering and scaling loop, output 516 is generated and made available for processing, storage, and/or display. The output 516 can include one or more of the spherical image 500, the rendered views 512, or indications of the faces or portions of faces detected within those rendered views 512. For example, the output 516 may be the output 404 shown in FIG. 4.

Implementations of the data sequence may differ from what is shown and described with respect to FIG. 5. In some implementations, the image scanner 502 may be omitted and the expected faces 510 may not be determined. For example, the view renderer 504 may generate the first rendered view 512 without using data indicating an expected location of a face within the spherical image 500. In such an implementation, the spherical image 500 can be used as input to the view renderer 504.

In some implementations, the image scanner 502 may scan the images combined to produce the spherical image 500 rather than the spherical image 500 itself. For example, the image scanner 502 can process first and second images that may later be combined to produce the spherical image 500, such as in a pre-processing step to such combining. In such an implementation, the image scanner 502 can use the M×N-sized windows to iteratively scan those first and second images without accounting for warping or other transformation of the images.

In some implementations, the detected face data 514 can be used to re-render a rendered view 512. For example, where the detected face data 514 indicates that a face or a portion of a face located within the rendered view 512 exceeds a size threshold, the scaling determiner 508 can determine a scaling factor indicating to lower a resolution of the rendered view 512. The view renderer 504 may then re-render the same rendered view according to the lowered resolution indicated by the scaling factor.

Figure 6A:
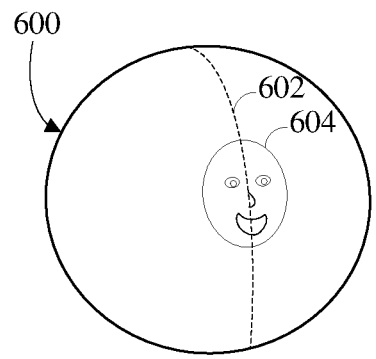
FIG. 6A is an illustration of an example of a spherical image with a face located at a stitch line.

FIG. 6A is an illustration of an example of a spherical image 600 with a face 602 located at a stitch line 604. The spherical image 600 can be produced by combining a first image captured using a first lens and a second image captured using a second lens. For example, the stitch line 604 can represent a location at which the first image and the second image are adjoined. One portion of the face 602 can be located on each side of the stitch line 604 such that a first portion of the face 602 is depicted within the first image and a second portion of the face 602 is depicted within the second image.

Figure 6B:
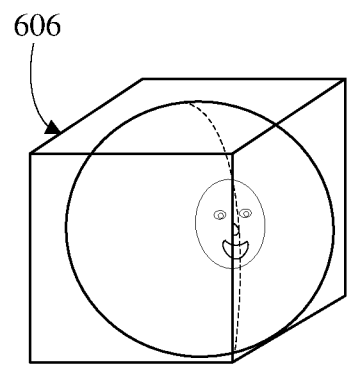
FIG. 6B is an illustration of an example of a bounding box used for projecting the spherical image of FIG. 6A.

FIG. 6B is an illustration of an example of a bounding box 606 used for projecting the spherical image 600 of FIG. 6A. The bounding box 606 is a virtual structure used to surround the spherical image 600 when projecting the spherical image 600 to a cubical projection (e.g., an equirectangular projection, a cube map projection, or the like). The bounding box 606 has six facets. Each of the facets corresponds to one view of the projection.

Figure 6C:
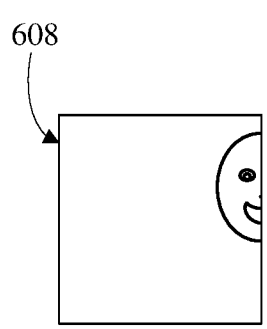
FIG. 6C is an illustration of a first view rendered based on the projection of the spherical image of FIG. 6A.
Figure 6D:
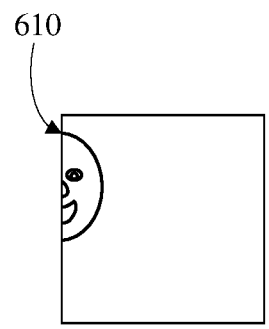
FIG. 6D is an illustration of a second view rendered based on the projection of the spherical image of FIG. 6A.

FIG. 6C is an illustration of a first view 608 rendered based on the projection of the spherical image 600 of FIG. 6A. FIG. 6D is an illustration of a second view 610 rendered based on the projection of the spherical image 600 of FIG. 6A. The first view 608 and the second view 610 each represents a two-dimensional planar view from the bounding box 606 after the spherical image 600 is projected onto the facets of the bounding box 606. As shown, the first view 608 depicts a first portion of the face 602 and the second view 610 depicts a second portion of the face 602.

Although the first and second portions of the face 602 respectively shown in the first view 608 and in the second view 610 are depicted as being the same or a substantially similar size, in some cases, the portions of a face depicted across a stitch line may instead be differently sized. For example, since image stitching may introduce artifacts (e.g., distortion or other visual changes) about the stitch line, it is possible that the portions of the face on each side may not have been in scale with one another. As such, in some implementations, the portions of the face 602 as shown in the first view 608 and in the second view 610 may be of different sizes.

Figure 7:
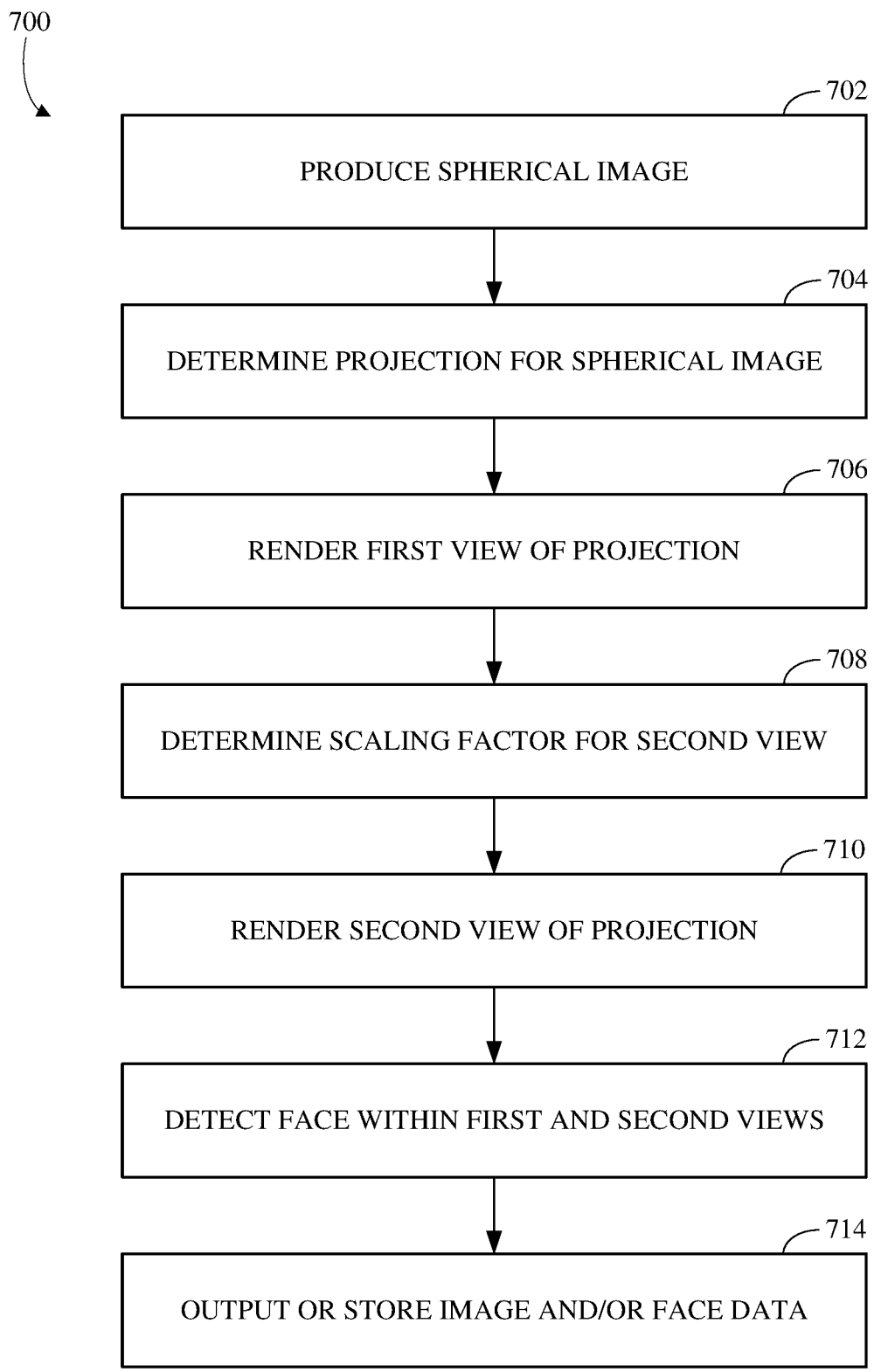
FIG. 7 is a flowchart showing an example of a technique for face detection in a spherical image.

Further details of implementations and examples of techniques performed using the systems, devices, and pipelines described with respect to FIGS. 1A-5 are now described. FIG. 7 is a flowchart showing an example of a technique 700 for face detection in a spherical image. The technique 700 can be performed, for example, using hardware and/or software components of an image capture system, such as the image capture device 100 shown in FIGS. 1A-D or the image capture device 200 shown in FIG. 2. For example, the image capture device 100 or the image capture device 200 may include one or more software components that process an image captured using an image capture device of the image capture device 100 or the image capture device 200, for example, an image processing unit and/or a face detection unit, such as described in the image processing and coding pipeline 400 shown in FIG. 4.

In another example, the technique 700 can be performed using an integrated circuit. The integrated circuit may, for example, be a field programmable gate array (e.g., FPGA), programmable logic device (PLD), reconfigurable computer fabric (RCF), system on a chip (SoC), ASIC, and/or another type of integrated circuit. An image processor of the integrated circuit may, for example, include an image capture unit and/or an image and face detection parameter processing unit (e.g., either, a processor having one or multiple cores) configured to execute instructions to perform some or all of the technique 700.

Although the technique 700 is described with respect to a series of operations, the operations comprising the technique 700 may be performed in orders other than those described herein. In some implementations, the technique 700 may include additional, fewer, or different operations than those described herein.

At 702, a spherical image is produced. Producing the spherical image includes combining a first image and a second image. The first image is captured using a first lens of an image capture unit and the second image is captured using a second lens of the image capture unit. Producing the spherical image can include capturing the first image and the second image. Alternatively, producing the spherical image can include receiving the first image and the second image, such as from a storage on-board an image capture device which includes the image capture unit or from a storage external to the image capture device.

At 704, a projection is determined for the spherical image. The projection may be an equirectangular projection, a cube map projection, or another projection used to project regions of the spherical image to two or more facets, or views. For example, where the projection expresses the spherical image in a cubical shape, the spherical image can be projected to six views. Each of the views may thus include a two-dimensional representation of a portion of the spherical image. Two of the views may adjoin at a location of the projection corresponding to a stitch line of the spherical image.

At 706, a first view of the projection is rendered. The first view corresponds to the first image combined to produce the spherical image. The first view of the projection is rendered based on a determination that a portion of a face is located within the first view. For example, the portion of the face located within the first view may be a smallest face identified during a pre-processing scanning operation performed against the spherical image. For example, the pre-processing can include scanning the spherical image to determine an expected location of one or more faces in the projection of the spherical image.

At 708, a scaling factor for use in rendering a second view of the projection is determined. The scaling factor is determined based on one or more characteristics of the first portion of the face. For example, the scaling factor can indicate to change a resolution used to render the first view when rendering the second view. In another example, the scaling factor can indicate to change a window to use for scanning the spherical image during the rendering of the second view.

The use of the scaling factor to render the second view causes a change in the depiction of the second portion of the face. For example, the scaling factor can indicate to decrease a resolution of the spherical image and increase an expected size of the second portion of the face, such that the change in the depiction of the second portion of the face is an increase in a size of the second portion of the face.

Furthermore, increasing the expected size of the second portion of the face can also result in an increase in an amount of overlap at a stitch line of the spherical image. The amount of overlap may be a sum of a first value indicating a number of pixels representing a dimension of the second portion of the face and a second value indicating a minimum face size detectable (e.g., by the face detection unit or other computing aspect).

At 710, the second view of the projection is rendered according to the scaling factor. Thus, the second portion of the face within the second view is rendered differently from the first portion of the face within the first view. The difference in rendering allows the first and second portions of the face to appear more consistent or similar in size, shape, and general appearance. This may, for example, decrease the likelihood of a false positive or false negative with respect to the detection of the face within the spherical image. At 712, a face is detected within the rendered first and second views.

At 714, the spherical image is and/or data indicative of the detected face are output or stored. In some cases, the spherical image is output to or stored at a first device or data store while the data indicative of the detected face are output to or stored at a second device.

Where certain elements of these implementations may be partially or fully implemented using known components, those portions of such known components that are necessary for an understanding of this disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., field programmable gate arrays (FPGAs)), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An image processor configured to perform operations, the operations comprising:
   capturing a first image using a first lens and a second image using a second lens, wherein the first image depicts a first portion of a face and the second image depicts a second portion of the face;
   producing a spherical image by combining the first image and the second image;
   determining a projection of the spherical image, wherein the projection includes a number of views, each of the views including a two-dimensional representation of a portion of the spherical image;
   rendering a first view of the projection of the spherical image based on a determination that the first portion of the face is located within the first view, wherein the first view corresponds to the first image;
   determining, based on one or more characteristics of the first portion of the face, a scaling factor for rendering a second view of the projection of the spherical image;
   rendering the second view according to the scaling factor, wherein use of the scaling factor to render the second view causes a change in depiction of the second portion of the face, wherein the second view corresponds to the second image; and
   detecting the face within the spherical image based on the rendered first view and the rendered second view.

2. The image processor of claim 1, wherein determining the projection of the spherical image comprises:
   scanning the spherical image to determine an expected location of the face in the projection of the spherical image,
   wherein the first view is rendered based on a determination that the expected location of the face is partially in the first view.

3. The image processor of claim 1, wherein determining the scaling factor for rending the second view comprises:
   determining the scaling factor based on a size of the first portion of the face within the rendered first view.

4. The image processor of claim 3, wherein the scaling factor indicates to decrease a resolution of the spherical image and increase an expected size of the second portion of the face, wherein the change in the depiction of the second portion of the face is an increase in a size of the second portion of the face.

5. The image processor of claim 4, wherein increasing the expected size of the second portion of the face increases an amount of overlap at a stitch line of the spherical image, the stitch line representing a location at which the first image and the second image are adjoined.

6. The image processor of claim 5, wherein the amount of overlap is a sum of a first value and a second value, the first value indicating a number of pixels representing a dimension of the second portion of the face, the second value indicating a minimum detectable face size.

7. The image processor of claim 1, wherein the projection of the spherical image is a cube map projection, wherein the cube map projection includes six views, the six views including the first view and the second view, each of the six views representing a different two-dimensional planar view of the cube map projection.

8. The image processor of claim 1, wherein each of the first lens and the second lens has a greater than 180 degree field-of-view.

9. An image capture apparatus, comprising:
   a first image sensor and a second image sensor arranged in opposing directions;
   a processor; and
   a memory including instructions executable by the processor to:
      produce a spherical image by stitching a first image captured using the first image sensor and a second image captured using the second image;
      scan the spherical image to detect a face located along a stitch line of the spherical image, wherein a first portion of the face is located in a first region corresponding to the first image and a second portion of the face is located in a second region corresponding to the second image;
      determine a projection of the spherical image by transforming the first image and the second image using a projection scheme;
      generate a first rendered view and a second rendered view of the projection of the spherical image, wherein the first rendered view corresponds to the first region and the second rendered view corresponds to the second region; and
      output an indication of the detected face within the first rendered view and the second rendered view.

10. The image capture apparatus of claim 9, wherein the first image sensor and the second image sensor have overlapping fields of view, wherein the instructions to produce the spherical image by stitching the first image captured using the first image sensor and the second image captured using the second image include instructions to:
    identify overlapping regions of the first image and the second image based on luminance distribution statistics of the first image and of the second image.

11. The image capture apparatus of claim 9, wherein the instructions to generate the first rendered view and the second rendered view of the projection of the spherical image include instructions to:
    generate the first rendered view based on a determination that the first portion of the face is located within the first region; and
    generate the second rendered view according to a scaling factor, wherein use of the scaling factor to generate the second rendered view causes a change in depiction of the second portion of the face.

12. The image capture apparatus of claim 11, wherein the scaling factor is determined based on one or more characteristics of the first portion of the face.

13. The image capture apparatus of claim 11, wherein the scaling factor indicates to decrease a resolution of the spherical image and increase an expected size of the second portion of the face.

14. The image capture apparatus of claim 11, wherein the instructions to scan the spherical image to detect the face located along the stitch line of the spherical image include instructions to:
iteratively scan portions of the spherical image using a window to detect the first portion of the face;
determine the scaling factor; and
change a size of the window to look for the second portion of the face.

15. A method, comprising:
producing a spherical image by combining a first image and a second image;
identifying a first portion of a face within a first region of the first image and located along a stitch line of the spherical image;
scaling a second region of the second image based on a size of the first portion of the face, wherein the first region and the second region are located along the stitch line of the spherical image;
generating rendered views of the first region and of the scaled second region; and
outputting an indication that the face is detected within the rendered views.

16. The method of claim 15, wherein producing the spherical image by combining the first image and the second image comprises:
capturing the first image using a first image sensor and a second image using a second image sensor;
identifying overlapping regions of the first image and the second image based on luminance distribution statistics of the first image and of the second image; and
stitching the first image and the second image according to the overlapping regions.

17. The method of claim 15, further comprising:
determining a projection of the spherical image by transforming the first image and the second image using a projection scheme.

18. The method of claim 17, wherein the projection includes a number of views, each of the views including a two-dimensional representation of a portion of the spherical image.

19. The method of claim 17, wherein the projection of the spherical image is a cube map projection, wherein the cube map projection includes six views, each of the six views representing a different two-dimensional planar view of the cube map projection.

20. The method of claim 15, wherein scaling the second region of the second image based on the size of the first portion of the face comprises:
changing a resolution of the spherical image.

* * * * *

UNITED STATES PATENT AND TRADEMARK OFFICE
CERTIFICATE OF CORRECTION

| | |
|---|---|
| PATENT NO. | : 11,636,708 B2 |
| APPLICATION NO. | : 17/420741 |
| DATED | : April 25, 2023 |
| INVENTOR(S) | : Thomas Armel Derbanne et al. |

It is certified that error appears in the above-identified patent and that said Letters Patent is hereby corrected as shown below:

On the Title Page

Item (57), Line 7 of the Abstract:
Add the word --on-- between "based" and "characteristics"

In the Claims

Claim 3, Column 21, Line 62:
Replace "rending" with --rendering--

Signed and Sealed this
Fourteenth Day of May, 2024

Katherine Kelly Vidal
*Director of the United States Patent and Trademark Office*